United States Patent [19]

Trickett

[11] Patent Number: 5,236,213
[45] Date of Patent: Aug. 17, 1993

[54] IV UTILITY POLE COUPLING AND TOWING DEVICE

[76] Inventor: James R. Trickett, 2699 Pontius Rd., Hartville, Ohio 44632

[21] Appl. No.: 654,218

[22] Filed: Feb. 12, 1991

[51] Int. Cl.$^5$ ............................................. F16C 11/00
[52] U.S. Cl. ................................ 280/304.1; 248/282; 248/647; 403/97
[58] Field of Search .......................... 280/304.1, 250.1; 403/97; 248/125, 282, 647, 917, 118, 979; 297/188, 194; 108/139

[56] References Cited

U.S. PATENT DOCUMENTS 2,488,898 11/1949 Brasty ................................. 248/282
4,253,649 5/1981 Hewson ............................... 403/97
4,969,768 11/1990 Young ................................. 403/97

Primary Examiner—Mitchell J. Hill
Attorney, Agent, or Firm—Oldham, Oldham, & Wilson Co., L.P.A.

[57] ABSTRACT

A towing device for connecting an IV pole or other instrumentation to a medical transporter, such as a wheelchair or gurney, so as to allow one person to transport a patient easily and safely in a medical transporter when passing through narrow doorways and corridors.

11 Claims, 3 Drawing Sheets

IV UTILITY POLE COUPLING AND TOWING DEVICE

TECHNICAL FIELD

The present invention generally relates to a coupling and towing device for connecting an IV pole to a gurney or wheelchair when transporting a patient from one hospital area to another. More specifically, the invention relates to a coupling and towing device which is easily attached to a wheelchair, gurney or other patient transporting vehicle, thereby integrating it as a natural part of the vehicle, wherein the device is adapted to secure an IV pole or the like thereto. The invention allows one person to transport a patient easily and safely in a wheelchair or gurney when the patient requires an IV utility pole.

BACKGROUND OF THE INVENTION

Although the present invention is potentially useful in a variety of environments, it was developed primarily for use in a medical facility. In this environment, patients many times require intravenous fluids, monitors, infusion pumps or the like for their medical treatment, wherein such equipment is supported on an IV pole. When the use of an IV pole is required, a problem existed in easily moving patients from one treatment area to another. Commonly, personnel have been utilized to guide an IV pole along with the gurney or wheelchair in which the patient is transported. Such a procedure frequently requires three people, two to handle the gurney and one to control the IV pole.

As an example, an intravenous fluid set-up, which requires the use of an IV pole, normally includes a fluid bottle and the delivery line which delivers the fluids and medication from the fluid bottle to a needle in the vein of the patient. The fluid bottle is suspended from an upright IV pole which may be permanently attached to the patient's bed, or which more frequently comprises a separate unit being a vertical pole mounted on rollers. As the detached, mobile IV pole allows the patient to be moved or transported when required, without disturbing the intravenous set up, it is by far the most commonly used device. In the movement of a patient using an IV set-up or other equipment supported on an IV pole, it is highly important that the IV set up be positioned closely adjacent the patient and fully controlled at all times to ensure patient safety and comfort. When moving or transporting a patient, loss of control of the IV set up is a potentially dangerous situation for a number of rather obvious reasons. It is therefore desirable and necessary for the IV pole to be moved simultaneously with the patient without any relative movement between the patient and IV pole. It should be evident that if no adequate and safe means for attaching an IV pole to a gurney or wheelchair is provided, extra personnel may be required for transporting a patient to ensure and the IV set-up remains intact and the patient remains safe and comfortable.

Various arrangements for coupling an IV pole to a wheelchair are known in the prior art, such as found in U.S. Pat. No. 4,511,157 which shows a female mounting sleeve attached to a wheelchair and a male extension attached to the IV pole, wherein the two parts are fitted together and secured by a threaded screw. This arrangement has been generally found to require significant time and effort to effect coupling of the wheelchair and IV pole and does not provide the desired flexibility to use the device with different size IV poles in the marketplace. Similar devices which allow an IV pole to be coupled to a wheelchair are disclosed in U.S. Pat. Nos. 4,431,206 and 4,190,224, both of which utilize a threaded screw clamp arrangement which have been found to be cumbersome and inefficient, thereby detracting from their effective use for the desired purpose.

In U.S. Pat. No. 4,767,131, there is provided a utility clamp for securing an IV pole to a wheelchair, which comprises a mounting plate secured to the wheelchair. The mounting plate extends outwardly from the wheelchair so as to engage an IV pole. A leg guide is provided on the mounting plate which provides a means to contain the wheeled leg of the IV pole, and the plate also includes a receiving pocket and variable cam for securing the IV pole thereto. The variable cam is rotatable from an open to a closed position, and is stated to provide a means by which the IV pole may be quickly secured thereto so as to couple the IV pole to the wheelchair. Although this prior patent discloses a construction for more effectively securing an IV pole to a wheelchair, it is somewhat obtrusive, especially when an IV pole is not being utilized, and also is not adaptable for various situations encountered when transporting a patient on a wheelchair or other transporting vehicles such as gurneys or the like.

SUMMARY OF THE INVENTION

Based upon the foregoing, there is found to be a significant need to provide a coupling and towing device which may be used to couple an IV pole to a wheelchair, gurney or other patient transporting vehicle which will allow a single person to efficiently and effectively transport a patient without disturbing an IV or other equipment set up. It is therefore a main object of the invention to provide a coupling and towing device which will allow secure coupling of the IV pole to the transporting vehicle to prevent relative motion between the IV pole and the transporting vehicle.

It is another object of the invention to provide a coupling and towing device which can be easily attached to or detached from the transporting vehicle as well as an IV pole.

It is another object of the invention to provide a coupling and towing device which includes a variety of adjustable positions so as to be easily coupled and utilized with a variety of transporting vehicles, and to allow easy and effective attachment and detachment to the transporting vehicle and IV pole.

It is another object of the invention to provide a secure and intact support by means of unique interlocking gear arrangement so as to provide secure coupling of an IV pole to a transporting vehicle in a selected fixed relationship for safe and effective transportation of patients therewith.

Yet another object of the invention is to provide a coupling and towing device which is more efficiently positioned with respect to the transporting vehicle so as to not interfere with movement of the vehicle in any manner, and which may be folded down and out of the way when not in use.

It is another object of the invention to provide a coupling and towing device which will allow an IV pole to be positioned in fixed relationship to a transportation vehicle such as a wheelchair or gurney, wherein the fixed relationship is adjustable such that the IV pole can be positioned to the side of the transportation vehicle so as to keep the IV pole out of the way of the transporter, or behind the transportation vehicle so as to allow passage through narrow doorways or corridors.

The invention allows extremely easy attachment and detachment of the device from a patient transporting vehicle such as a wheelchair or gurney, and allows any size IV pole to be coupled therewith in seconds to increase labor efficiency and to minimize liability in a medical or other working environment.

These and other objects of the invention are achieved by a device for adjustable coupling of a first mobile device, such as a wheelchair of the like, to a second mobile device, such as an IV pole, in a fixed relationship both easily and efficiently. The coupling and towing device generally comprises a first arm portion having means for coupling the first arm with a wheelchair, gurney or the like. The first arm portion is coupled to a translation arm by means of a first joint means which allows the user to selectively position the translation arm in a desired relative orientation to the first arm portion of the coupling device. A second arm portion is also coupled to the translation arm by means of a second joint means, wherein the second arm includes means for coupling the second arm portion to an IV pole.

The arrangement allows an IV pole to be fixedly positioned relative to the wheelchair or the like, and this position may be adjusted according to various needs or desires of the user. The first and second joint means are lockable and may comprise cooperating gear arrangements associated with the first and second arms as well as the translational arm of device so as to selectively position each of the first and second arms relative to one another by means of the interengaging translational arm. In a preferred form, the joint means may allow movement of the translational arm relative to the first arm member in a first direction and movement of the second arm portion relative to the translation arm in a second direction which is perpendicular to the first. The arrangement allows the device to be easily and effectively coupled to the patient transportation vehicle as well as an IV pole or the like in a fixed relationship while allowing a wide variety of adjustability to be achieve for relative positioning of the transportation vehicle and IV pole. The arrangement also allows the device to be conveniently positioned in a folded down position so as to not interfere with use of the transportation vehicle when no IV pole or the like is being utilized, or to prevent interference with the mounted hardware of the transportation vehicle or IV pole.

BRIEF DESCRIPTION OF THE DRAWINGS

These and other objects of the advantages of the present invention will become more readily apparent from a further reading of the detailed description of the preferred embodiments, taken in conjunction with the drawings, wherein.

DETAILED DESCRIPTION

Figure 1:
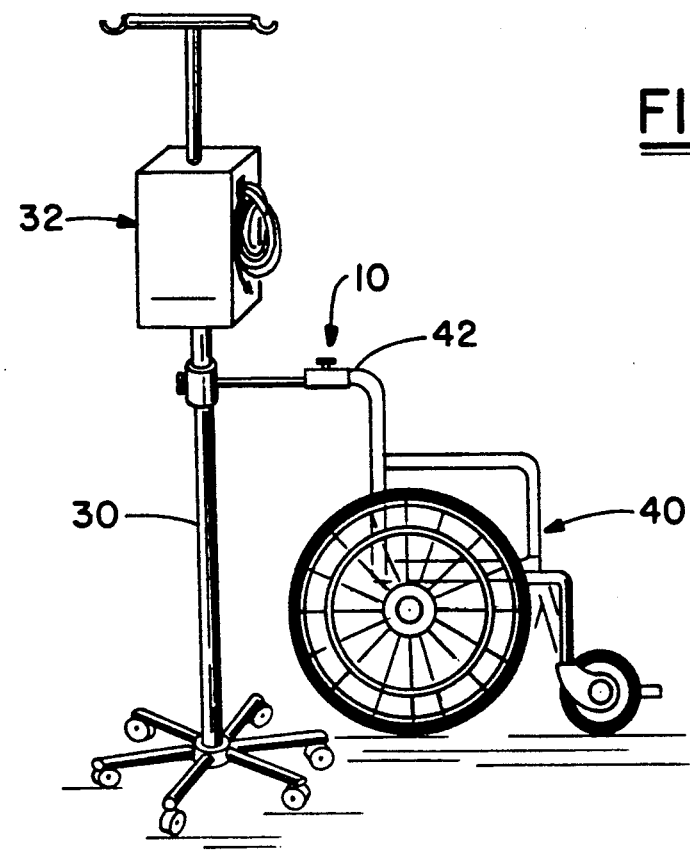
FIG. 1 is a perspective view of the coupling device of the invention installed in place on the arm of a wheelchair, and having an IV pole coupled therewith;.

This invention will be described in detail with reference to the preferred embodiment thereof. Like elements are identified by like reference numerals throughout the drawings and specification.

Referring now to FIG. 1, the coupling and towing device 10 of the invention can be installed for use with a wheelchair 40 or other patient transporting vehicle. This invention allows one person to transport a patient easily and safely when an IV pole 30 or other portable instrumentation is being used by the patient and is required to be transported therewith. In a preferred embodiment, the present invention 10 is installed on a handle 42 of wheelchair 40 by removing the original rubber grip normally positioned thereon, thereby integrating the present invention 10 as a natural part of the wheelchair 40. It should be evident that the device 10 may be secured to the wheelchair 40 at other locations if desired or may be provided as integral part of wheelchair 40 when purchased. As described, the coupling device 10 is adapted to engage and secure an IV pole 30 having any of a variety of equipment such as fluid bottles, monitoring equipment or otherwise supported thereon and generally indicated at 32.

In the normal situation, an intravenous set-up or the attachment of monitoring hardware supported on the IV pole 30, will be somehow secured to a patient sitting in wheelchair 40. With an intravenous set-up, a needle and delivery line will be attached to the patient's arm, wherein any tension or pressure applied to the delivery line will cause pain and discomfort to the patient. Similarly, with monitoring equipment, various attachments may be made to the patient's body which will require the position of the IV pole 30 supporting the equipment to be maintained relative to the patient. The coupling device 10 allows the relative position of IV pole 30 to wheelchair 40 to remain constant, regardless of whether a patient is to be transported to some other location using wheelchair 40. Normally, when a patient is to undergo tests or various medical treatments, the patient will be moved from a hospital bed to wheelchair 40, and thereafter the IV pole 30 can be secured to wheelchair 40 by means of the coupling device 10. As will be described in more detail as the description proceeds, the relative location of the IV pole 30 and wheelchair 40 may be adjusted for particular needs or requirements encountered. For example, the monitoring equipment or intravenous set-up may require the IV pole to be positioned to the side of wheelchair 40 so as to allow proper connection thereof to the patient and to avoid interference from the wheelchair itself. When positioned to the side of wheelchair 40, the IV pole 30 will be out of the way of the person pushing the wheelchair 40 or transporting the patient therein. Alternatively, the IV pole 30 may be positioned directly behind the wheelchair 40 using the coupling device 10, so as to permit passage of the wheelchair through narrow doorways or corridors unhindered by the presence of the IV pole 30 and the associated medical equipment supported thereon. In both these situations, the device 10 essentially forms an extension arm extending outwardly from wheelchair 40 as seen in FIG. 1. Thus, the coupling device 10 allows the IV pole 30 and the medical equipment supported thereon to be positioned in fixed relationship to the patient sitting in wheelchair 40 so as to avoid any possible harm or discomfort to the patient during transporting thereof. The fixed relationship of IV pole 30 and wheelchair 40 is adjustable to allow convenient use and to facilitate transportation in any environment. It should also be evident that once the IV pole 30 is coupled in its fixed relationship to wheelchair 40, transportation of a patient is simplified to increase labor efficiency and to minimize liability in a medical working environment as an example.

Figure 2:
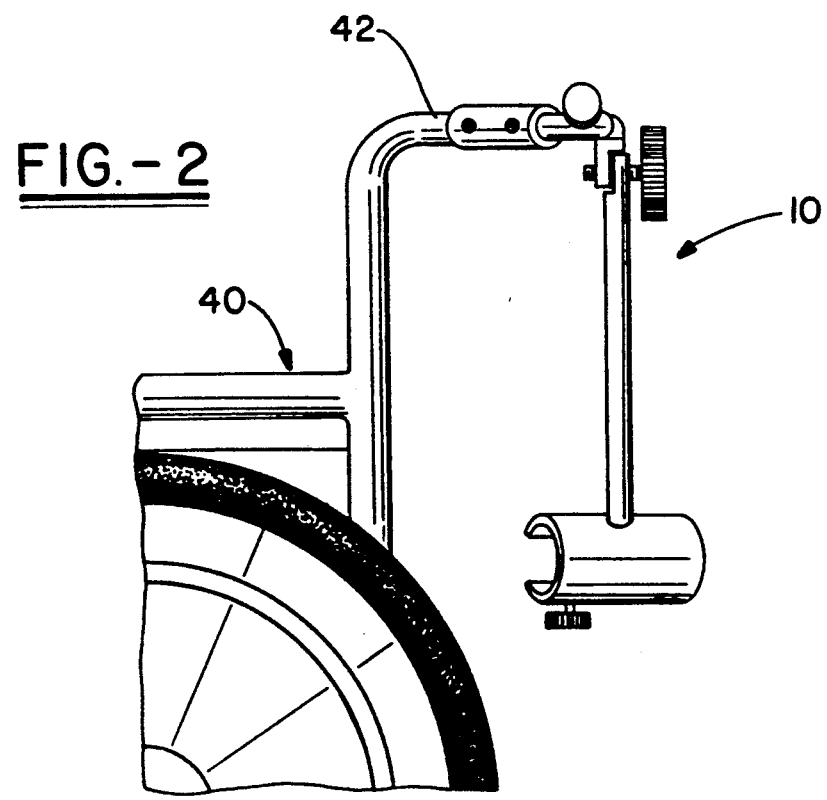
FIG. 2 is an enlarged perspective view of the present invention as seen in FIG. 1, in its folded down position when not in use.

A unique feature of the present invention 10 is its ability to fold down and out of the way when not in use as shown in FIG. 2. As will be described, the structure of the coupling device 10 allows a majority of its length to be folded to a position behind wheelchair 40, such that the wheelchair 40 may be used in the typical manner without any obstruction from the coupling device 10. Thus, the coupling device 10 may be maintained in its connected position with wheelchair 40 whether in use for coupling an IV pole thereto or whether simply being used to transport a patient without an IV pole. When needed to couple an IV pole to the wheelchair 40, the coupling device is easily and quickly positioned so as to engage and secure an IV pole thereto as seen with respect to FIG. 1. The ability to be unobstructively secured to a wheelchair 30 or other patient transporting vehicle so as to become an integral part of the vehicle, allows the effective use of the coupling device 10 in an efficient and simple manner. This characteristic of the coupling device will save significant effort and time in the use of the device and increases the labor efficiency when transporting patients while allowing safe and comfortable transport thereof. In either the coupling or down configuration, the present invention 10 does not interfere with previously mounted hardware such as oxygen tanks, or the like on IV pole 30 or wheelchair 40.

Figure 3:
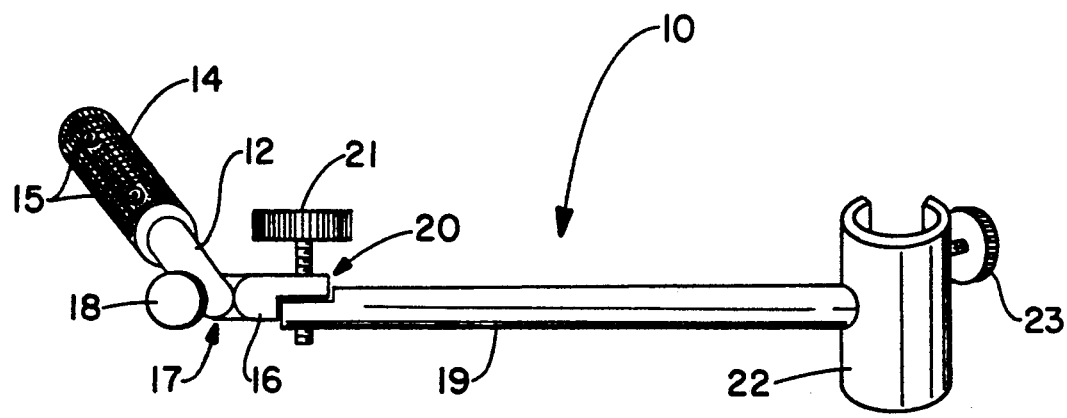
FIG. 3 is an enlarged perspective view of the present invention.

Turning now to FIG. 3, there is shown in more detail the coupling and towing device of a preferred embodiment of the invention for use with a wheelchair as seen in FIG. 1. In this embodiment, the device 10 includes a first arm portion 12 which is adapted to be coupled to the patient transporting vehicle such as a wheelchair. As described previously, the first arm portion 12 may have a coupling handle 14 which is adapted to engage and be secured to the conventional handle portion of a wheelchair. The coupling handle 14 may have a gnurled surface or a spongy rubber-type exterior for gripping thereof similar to the conventional handle of the wheelchair. The coupling handle 14 may be secured to the handle of a wheelchair by means of a plurality of set screws 15 or other suitable means. The coupling handle 14 is quickly and easily secured to a wheelchair handle, and becomes an integral part of the wheelchair for conventional use thereof in transporting patients, as well as to facilitate transportation with an IV pole coupled thereto. The first arm portion 12 is itself adjustably coupled to a translational arm 16, which in the preferred embodiment is adjustable in a first or vertical direction relative to first arm portion 12 as attached to a wheelchair by a means of coupling handle 14. The relative positions between first arm portion and translational arm 16 are selectively adjusted by a first joint means 17 coupling the first arm portion 12 and translational arm 16. The joint means of the invention will be described in more detail as the description proceeds, but allows the translational arm 16 to be selectively positioned at a variety of different orientations relative to first arm portion 12, and includes a hand rotatable tightening knob 18 associated therewith, which will allow the user to selectively lock joint 17 at a desired position to fix the relative orientation between first arm portion 12 and translational arm 16. The translational arm 16 is also coupled to a second arm portion 19 by means of a second joint means 20, which again allows the relative orientation of second arm portion 19 to be varied with respect to translational arm 16. The joint means 20 may also include a tightening knob 21 adapted to selectively lock the orientation of the second arm portion 19 relative to translational arm 16. The second arm portion 19 also includes, at the opposite end from the connection to translational arm 16, a screw clamp means 22 which is adapted to engage and secure an IV pole therein. The screw clamp 22 may also include a tightening knob 23 which will allow screw clamp 22 to be secured to any size IV pole quickly and easily. The device 10 may be constructed of a metal or rigid and durable polymeric material as desired.

Figure 4:
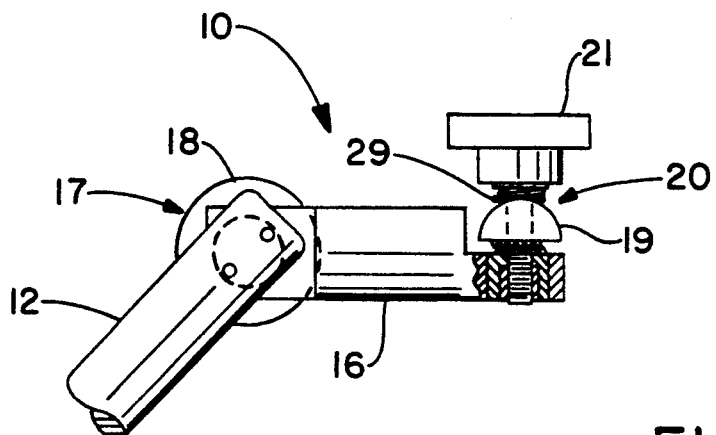
FIG. 4 is a partial cut away side elevation view of the translational arm and translational adjusters of the present invention.
Figure 5:
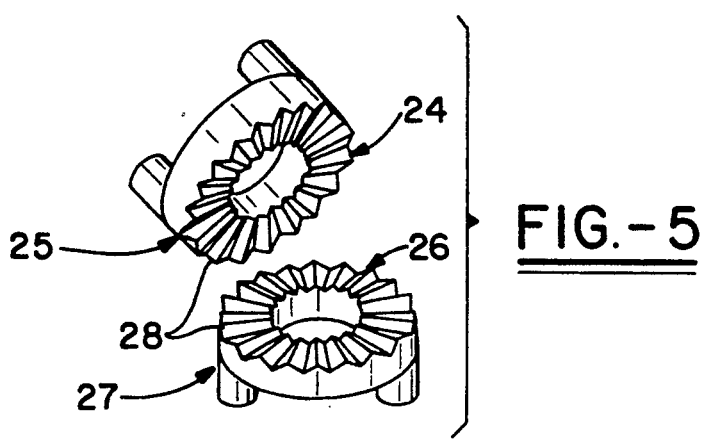
FIG. 5 is an explodes perspective view of a preferred embodiment of the joint means of the invention.
Figure 6:
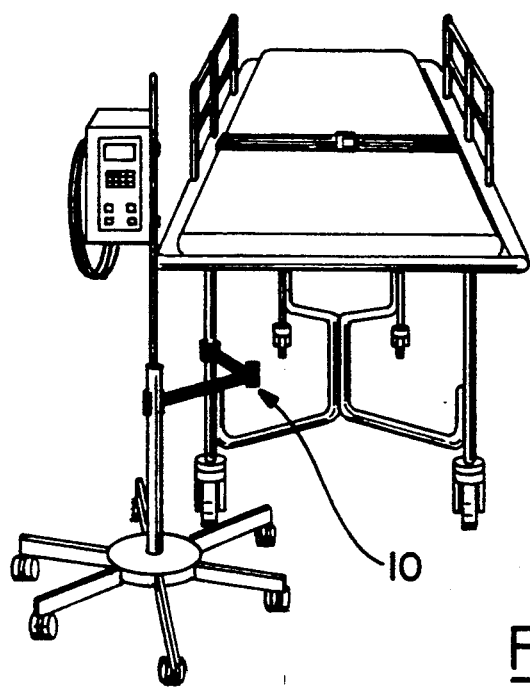
FIG. 6 is a perspective view of the present invention installed on a gurney.

Turning now to FIGS. 4 and 5, the joint means of the preferred embodiment will be described in more detail. As mentioned previously, the coupling device of the invention is advantageously used in association with typical patient transportation vehicles such as wheelchairs, gurneys or the like, to allow an IV pole to be selectively coupled thereto in a fixed relationship. As not all patients to be transported with the wheelchair or gurney will be using medical treatment equipment which is supported on an IV pole, it is extremely desirable to provide the device 10 with the capability of being selectively removed from any imposing or obstructing position when not in use, while avoiding the necessity of removing the device from the transporting vehicle entirely.

As mentioned with respect to FIG. 2, it is therefore an aspect of the coupling device to allow the device to be selectively positioned in a downward or inward configuration, such that it is out of the way of a patient or person transporting a patient with the vehicle. The first joint means 17 coupling the first arm portion 12 and translational arm 16 therefore allows the translational arm to be positioned in a direction perpendicular or even extending back toward first arm portion 12 so as to limit outward extension of device 10 to essentially the first arm portion 12 thereof. The second arm portion 19 may then be oriented relative to the translational arm 16 by means of second joint means 20, so as to extend still further downwardly or inwardly toward the back of a wheelchair or in some other unobstructive position relative to the wheelchair or other transportation vehicle. In a preferred embodiment, the first joint means 17 may be positioned to allow movement of the translation arm 16 relative to the first arm member in a first direction, and the second joint means 20 may be provided to allow movement of the second arm portion 19 in a second direction perpendicular to the first. As an example, the first arm portion 12 may be connected to the handle of a wheelchair by means of coupling handle 14 such that first joint means 17 will allow vertical movement of translation arm 16 relative thereto. The second joint means 20 will then allow substantially horizontal movement of second arm portion 19 to facilitate placement of an IV pole to the side of the wheelchair to keep the IV pole out of the way of a transporter, or behind the wheelchair to allow passage thereof through narrow doorways or corridors regardless of the presence of the IV pole.

As seen in FIG. 5, a preferred embodiment of the joint means comprises an interlocking gear arrangement, wherein gear teeth 28 are formed on a surface 24 of a joint element 25 associated with first and second arm portions 12 and 19 respectively. Corresponding gear teeth are also provided on a surface 26 of translation arm 16. As an example, the interengaging gear teeth 28 may be angled upwardly from a center portion of the joint means to form a ratchet type gear arrangement, and may have corresponding angled faces on each of the gear teeth 28 to allow a predetermined amount of angular movement between interlocking positions of gear teeth 28 to allow a wide variety of variable positions to be achieved between the respective arm members of the device. As seen in FIG. 4, the tightening knobs 18 and 21 associated with each of the joint means 17 and 20 respectively may be provided with a spring member 29 interposed between the tightening knob and structural member of the joint means carrying the surfaces 24 and 26 having gear teeth 28 thereon. In this way, upon loosening of knob 18 or 21, the spring 29 will bias the gear faces into engaging relationship to prevent relative movement therebetween except when desired. To vary the orientation between the first or second arm portion 12 and 19 and the translation arm 16, the user can simply apply a rotational force to the respective arm member, wherein the bias force of spring 29 will be overcome until the desired orientation is achieved. Thereafter, the tightening knobs 18 and 21 may be securely tightened to prevent any further relative rotation of the arm members with translation arm 16 by means of interengaging gear teeth 28. The joint means of the invention may have the gear teeth 26 machines into the surfaces 24 and 26 formed integrally with arm portions 12 and 19, or alternatively can be provided as separate elements, as shown in FIG. 5.

Although the invention has been described with reference to a preferred embodiment thereof, it should be apparent that various modifications or changes may be made without departing from the spirit and scope of the invention. For example, the screw clamp arrangement 22 on second arm portion 19 may be provided as any suitable means which will allow easy and efficient coupling of an IV pole thereto. Similarly, the coupling handle 14 on the first arm portion 12 may be provided as a suitable coupling arrangement to allow the device 10 to be easily and effectively connected to a structural member of a gurney or other patient transportation vehicle as desired. Such a coupling arrangement to allow the first arm portion 12 to be coupled to a gurney may be similar to the screw clamp means 22 associated with second arm portion 19. It is therefore understood that such modifications are contemplated herein, and the scope of the invention is not limited thereby, and the changes may be made without departing from the scope of the invention as defined in the appended claims.

I claim:

1. A device for adjustably coupling a first mobile device to a second mobile device in fixed relationship, said device comprising:
   a) a first arm member having first and second ends, said first end having means for coupling said first arm member with said first mobile device;
   b) a translational arm member having first and second ends, with said first end thereof coupled to said second end of said first arm portion by means of a first joint means which allows the orientation of said translational arm member to be varied relative to said first arm member; and
   c) at least a second arm member having first and second ends, said first end being coupled to said second end of said translational arm member by means of a second joint means which allows the orientation of said second arm member to be varied relative to said translational arm member, and said second end having means for coupling said at least second arm member with said second mobile device, said first and second joint means comprising surfaces at said second ends of said first and second arm members and corresponding surfaces at said first and second ends of said translational arm member which include cooperatively interengaging gear teeth, means for biasing said cooperatively interengaging gear teeth together, and means for locking said interengaging gear teeth in a fixed position relative to one another.

2. The device as recited in claim 1; wherein, said first mobile device is a wheelchair and said first arm member is permanently affixed to said wheelchair.

3. The device as recited in claim 1, wherein, said first mobile device is a gurney and said first arm member is permanently affixed to said gurney.

4. The device as recited in claim 1, wherein, said first mobile advice is a wheelchair and said first arm member is temporarily affixed to said wheelchair, wherein said means for coupling said first arm member comprises a coupling handle adapted to be secured to the handle of said wheelchair.

5. The device as recited in claim 1 wherein, said first mobile device is a gurney and said first arm member is temporarily affixed to said gurney, wherein said means for coupling said first arm portion member comprises a clamp means adapted to be secured to a structural member of said gurney.

6. The device as recited in claim 1, wherein, said first and second joint means are formed as a ratchet-type gear with said means for biasing said cooperatively interengaging gear teeth together being operative to prevent relative movement between said gear teeth until an external force is applied to at least one of said arm members, and said locking means thereafter being operative to fix the relative positions of said joint means.

7. The device as recited in claim 1, wherein, said first joint means has a first rotational axis and allows rotational movement of said translational arm relative to said first arm portion in a first direction, and said second joint means has a second rotational axis and allows rotational movement of said second arm portion to said translational arm in a second direction which is distinct from said first direction.

8. The device as recited in claim 7, wherein said first and second rotational axes are substantially perpendicular to one another such that said first and second directions are substantially perpendicular to one another.

9. A device for adjustably coupling an IV pole and a piece of equipment in fixed relative positions to one another comprising:
   a first arm member having first and second ends, said first end including means for coupling said first arm member to an IV pole, and said second end including a surface with gear teeth formed thereon,
   at least another arm member having first and second ends, said second end including a surface with gear teeth formed thereon which cooperatively engage said gear teeth formed on said first arm member to form a joint means, said joint means formed as a ratchet-type gear with means for biasing said cooperatively engaging gear teeth together and locking means operative between locked and unlocked positions, wherein said locking means will prevent relative movement between said cooperatively engaging gear teeth when in said locked position and will allow when in said unlocked position, wherein said means for biasing will act to maintain the relative position of said cooperatively engaging gear teeth by forcing said gear teeth together when said locking means is in an unlocked position while allowing relative movement between said cooperatively engaging gear teeth upon application of an external force to one of said arm members which will cause ratcheting of said cooperating gear teeth against the biasing force of said means for biasing in said joint means.

10. The device as recited in claim 9, wherein, said surface including said cooperatively engaging gear teeth are angled upwardly from a center portion of said joint means to form said ratchet-type gear arrangement.

11. The device as recited in claim 9, wherein, said means for biasing comprises a spring member interposed between said locking means and said joint means such that upon positioning said locking means in said unlocked position, said spring member will continue to act on said joint means to maintain the relative position of said gear teeth associated with said joint means.

* * * * *